May 31, 1966 L. OESTEREICHER 3,253,625

DRIVING BITS FOR NON-REMOVABLE SCREW FASTENERS

Original Filed Aug. 21, 1963

INVENTOR
LOUIS OESTEREICHER
BY
Prangley, Baird, Clayton,
Miller & Vogel
ATTYS.

United States Patent Office 3,253,625
Patented May 31, 1966

3,253,625
DRIVING BITS FOR NON-REMOVABLE
SCREW FASTENERS
Louis Oestereicher, Teaneck, N.J., assignor to General American Transportation Corporation, Chicago, Ill., a corporation of New York
Original application Aug. 21, 1963, Ser. No. 303,542. Divided and this application Sept. 3, 1965, Ser. No. 485,021
2 Claims. (Cl. 145—50)

The present invention relates to driving bits for non-removable screw fasteners. This application is a division of the copending application of Louis Oestereicher, Serial No. 303,542, filed August 21, 1963.

Automobile manufacturers have found highly desirable screw fasteners of the character noted for the purpose of retaining fixtures, upholstery, etc., in place in the interior of an automobile body, since it is the experience of these manufacturers that the items mentioned seldom require removal, whereas the screw fasteners employed in retaining in place these items are frequently removed by children and others by idle or mischievous tampering with the screw fasteners.

It is a general object of the invention to provide a driving bit for a non-removable screw fastener of the character disclosed and claimed in the Oestereicher application mentioned, wherein the bit is especially constructed and arranged to effect rapid driving or setting of these peculiar screw fasteners.

Another object of the invention is to provide a bit of the character noted that effects clutch engagement with a cooperating screw fastener when the bit is rotated in the driving direction and that effects clutch disengagement with a cooperating screw fastener when the bit is rotated in the retrograde direction, whereby the bit accommodates ready setting of the screw fastener with respect to an associated workpiece, but does not accommodate unsetting or removal of the screw fastener with respect to the workpiece.

A further object of the invention is to provide an improved driving bit for the screw fastener of the character described, which is superior for the driving purpose to a conventional flat driving bit.

Further features of the invention pertain to the particular arrangement of the elements of the driving bit, whereby the above-outlined and additional operating features thereof are attained.

The invention, both as to its organization and method of operation, together with further objects and advantages thereof, will best be understood by reference to the following specification, taken in connection with the accompanying drawing, in which.

Figure 1:
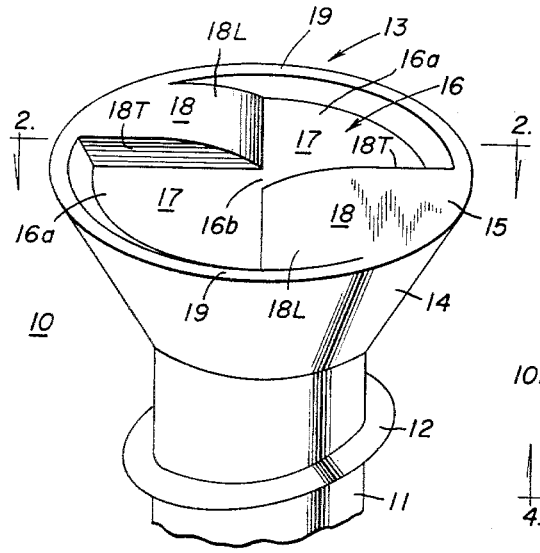
FIGURE 1 is a fragmentary rear perspective view of a screw fastener that may be driven or set by a driving bit embodying the present invention.
Figure 2:
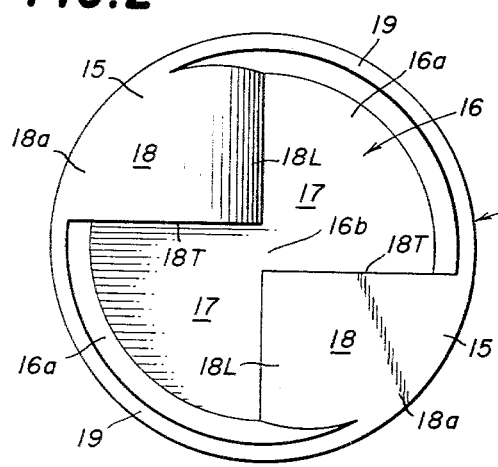
FIG. 2 is a plan view of the head of the screw fastener, as shown in FIG. 1.

Referring now to FIGS. 1 and 2 of the drawing, the screw fastener 10 there illustrated is of the type that may be readily driven or set with a conventional driver of the flat-bit type with respect to an associated workpiece, but cannot be readily unset or removed with such driver with respect to the associated workpiece; which actions are achieved by the peculiar construction and arrangement of clutch structure incorporated in the head thereof, as explained more fully below. Specifically, the fastener 10 comprises an elongated longitudinally extending shank 11 carrying a helical thread 12, and an enlarged head 13 of the countersink type carried on the rear end of the shank 11. The head 13 includes the usual forwardly tapered bearing surface 14 of generally frusto-conical configuration, and a flat outer face 15 provided with a substantially circular boundary and disposed in a first or rear plane substantially normal to the longitudinal axis of the shank 11.

The outer end of the head 13 has a tool-receiving recess 16 formed therein and disposed substantially symmetrically with respect to the longitudinal centerline of the shank 11, the recess 16 having a flat bottom wall 17 disposed in a second or front plane substantially normal to the longitudinal axis of the shank 11, the front plane of the bottom wall 17 being spaced longitudinally forwardly of the rear plane of the outer face 15. The recess 16 includes two sector-shaped and diametrically opposed wings 16a and a narrow connecting passage 16b and defining two sector-shaped and diametrically opposed mounds 18 on the outer end of the head 13 and positioned in intervening relation with respect to the two wings 16a. The recess 16 also defines two arcuate-shaped and diametrically opposed rim-like elements 19 respectively bounding the outer portions of the wings 16a and respectively joining at the opposite ends thereof the adjacent portions of the mounds 18; whereby the front end of a flat driving bit, not shown, of conventional construction and arrangement and of proper dimensions may be inserted from the exterior into the narrow passage 16b and into the connecting wings 16a and between the rim-like elements 19 and pressed forwardly into engagement with the bottom wall 17.

Each of the mounds 18 includes an outer surface 18a disposed substantially in the outer face 15 and angularly displaced leading and trailing surfaces 18L and 18T each extending between the outer surface 18a and the bottom wall 17. Each of the trailing surface 18T is positioned substantially normal to the bottom wall 17 and to the outer face 15 and constitutes a tool-engaging shoulder; and each of the leading surfaces 18L gradually slopes from the bottom wall 17 in the trailing direction to the outer surface 18a and constitutes a tool-engaging cam.

The tool-engaging shoulders 18T are positioned in confronting relation with the respective leading portions of the wings 16a and thus on opposite and diametrically opposed sides of the narrow connecting passage 16b. Accordingly, when the inserted flat drive bit, not shown, is rotated in the drive direction, the opposite drive surfaces thereof respectively engage the tool-engaging shoulders 18T, so as to rotate the fastener 10 in the drive direction with respect to a cooperating workpiece, not shown, in which the fastener 10 is to be driven or set. The tool-engaging cams 18L are positioned in confronting relation with the respective trailing portions of the wings 16a and on opposite sides of the narrow connecting passage 16b and in substantial alignment with each other and substantially normal to the principal axis of the narrow connecting passage 16b. Accordingly, when the inserted flat drive bit, not shown, is rotated in the retrograde direction, the opposite drive surfaces thereof respectively engage the tool-engaging cams 18L, so as to cam the flat drive bit rearwardly out of the narrow connecting passage 16b and out of the wings 16a in order to prevent rotation of the fastener 10 in the retrograde direction with respect to the cooperating workpiece, not shown, in which the fastener 10 is driven or set. Hence, employing a conventional flat bit screwdriver, the fastener 10 may be readily set into a cooperating workpiece, but cannot be unset or removed from the cooperating workpiece in which it is driven or set.

Continuing the reference to FIGS. 1 and 2, it is noted that the tool-engaging shoulders 18T are respectively disposed in first and second substantially parallel reference planes respectively positioned in spaced-apart relation and arranged on opposite sides of the longitudinal centerline of the shank 11, and thus displaced from each other by the width of the narrow connecting passage 16b. Also, the respective junctions of the tool-engaging cams 18L with the bottom wall 17 are disposed in a third reference plane passing through the longitudinal centerline of the shank 11 and disposed substantially normal to each of the previously mentioned first and second substantially parallel reference planes. Further, the inner surfaces of the rim-like elements 19 are substantially concentric with the longitudinal centerline of the shank 10; and the inner surface of each of the rim-like elements 19 slopes outwardly and rearwardly from the bottom wall 17 to the outer face 15.

In the screw 10, the thread 12 carried by the shank 11 may be of any suitable type, such as a machine thread, self-tapping thread, etc.; and the thread 12 may be formed by any suitable method, such as rolling, machining, etc.; and the fastener 10 may be formed of any suitable metal, such as steel, stainless steel, brass, aluminum, etc. Normally, the fastener 10 is formed of steel, and the thread 12 is rolled and is of the self-tapping type. In any case, the head 13 is formed by upsetting a section of cylindrical wire stock and by punching the outer surface of the upset head; which two operations or steps may be carried out in sequence or simultaneously. In other words, combination upsetting and punching dies are preferably employed; and after the head 13 is thus completely formed by these coldheading operations, the cylindrical stock for the shank 11 is subjected to pressure between rolling dies, so as to produce the finished shank 11 carrying the rolled thread 12. Ultimately, the thus formed fastener 10 is subjected to conventional heat-treatment, so as suitably to harden the same, the last-mentioned step being essential when the thread 12 is of the self-tapping type.

In the construction of the screw fastener 10 for the intended use, as previously explained, it is an important feature that the head 13 thereof is of the countersink type, since it is obvious that after complete driving or setting of a screw of this type, the head thereof is altogether inaccessible, so that the same cannot be frictonally engaged by a pair of pliers, or other such common tool, to facilitate ready removal of the screw fastener from the cooperating workpiece. Thus, after driving or setting of the screw fastener 10, no common tool is useful to effect ready unsetting or removal thereof, as is intended.

Figure 3:
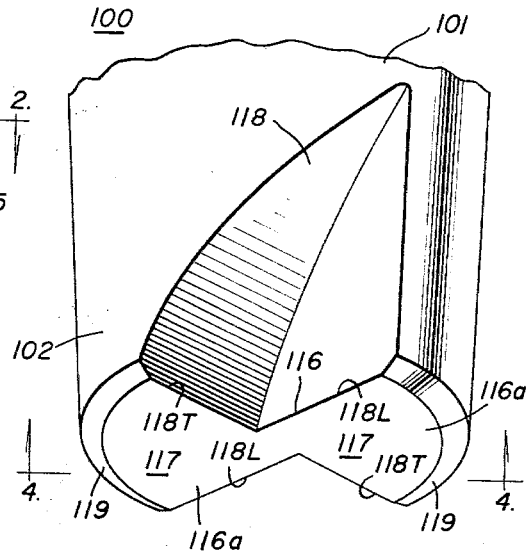
FIG. 3 is a fragmentary front perspective view of a driving bit embodying the present invention and especially adapted for use in driving or setting the screw fastener, as shown in FIGS. 1 and 2.
Figure 4:
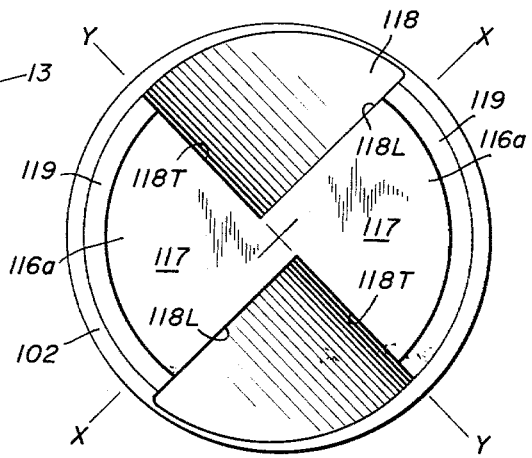
FIG. 4 is a plan view of the front end of the driving bit, as shown in FIG. 3.
Figure 5:
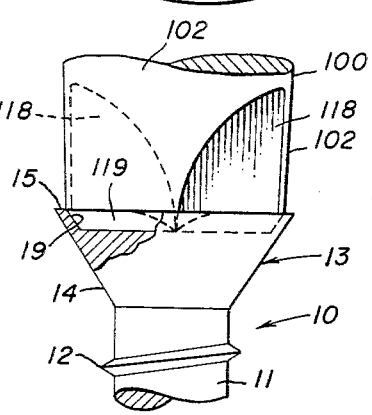
FIG. 5 is a reduced fragmentary side elevational view, partly broken away, of the screw fastener and the driving bit therefor and illustrating the cooperating interfit of the respective elements thereof.

While the fastener 10 may be driven or set by a conventional screwdriver of the flat-bit type, as previously described, it is highly advantageous to employ for the driving purpose the driving bit 100, illustrated in FIGS. 3 and 4, and embodying the features of the present invention. At the outset, it is noted that the bit 100 comprises an elongated longitudinally extending shank 101 having a forwardly tapered front end portion 102 that comprises a configuration complemntary to that of the rear outer end of the head 13 of the screw fastener 10, so that when the front end portion 102 engages the rear outer end of the head 13, it fits thereinto in a complementary manner, as illustrated in FIG. 5. Thus, the front end portion 102 terminates in a flat front face 117 disposed in a plane substantially normal to the longitudinal axis of the shank 101 and provided with two circumferentially spaced-apart arcuate-shaped chamfered areas 119 extending rearwardly and radially outwardly from the flat front face 117. Two longitudinally extending and diametrically opposed flutes 118 are provided in the front portion 102 and extending forwardly into intersecting relation with the front face 117, so as to shape the front face 117 to match that of the bottom wall 17 of the recess 16 provided in the head 13 of the fastener 10. Each of the flutes 118 includes leading and trailing surfaces respectively forming at the intersection with the front face 117 leading and trailing shoulders 118L and 118T.

The front face 117 has X and Y axes of symmetry disposed at right angles to each other and intersecting each other at the longitudinal axis of the shank 101. One of the leading shoulders 118L lies along a line positioned on one side of the Y axis and disposed above and substantially parallel to the X axis; and the other of the leading shoulders 118L lies along a line positioned on the other side of the Y axis and disposed below and substantially parallel to the X axis. One of the trailing shoulders 118T lies along a line substantially coincident with the Y axis and disposed above the X axis; and the other of the trailing shoulders 118T lies along the line substantially coincident with the Y axis and disposed below the X axis. Thus, the front face 117 includes two sector-shaped and diametrically opposed wings 116a and a narrow connecting bridge 116b.

In view of the foregoing, it will be understood that when the front end portions 102 of the bit 100 is inserted into the rear outer end of the head 13 of the screw fastener 10, as shown in FIG. 5, the flat front face 117 engages the flat bottom wall 17, the two chamfered areas 119 respectively engage the inner surfaces of the two rim-like elements 19, the two flutes 118 respectively accept the two mounds 18, the two wings 116a are respectively disposed in the two wings 16a, the narrow connecting bridge 116b is disposed in the narrow connecting passage 16b, the two leading shoulders 118L respectively engage the two trailing shoulders 18T, and the two trailing shoulders 118T respectively engage the two leading shoulders 18L.

Hence, when the inserted bit 100 is rotated in the driving direction, the fastener 10 is driven or set into a cooperating workpiece; on the other hand, when the inserted bit 100 is rotated in the retrograde direction, the front portion 102 of the bit 100 is cammed out of the recess 16 in the head 13 of the fastener 10 without unsetting or removing the screw 10 from the cooperating workpiece.

Preferably, the bit 100 is formed of tool steel, and after a suitable length thereof is provided the tapered portion 102, the chamfered portions 119 and the front face 117 are suitably ground thereon. Then the flutes 118 are appropriately milled into the front portion 102, so as to define the element 116a and 116b. The bit 100 is then heat-treated to harden the same; and thereafter, the bit 100 is polished to produce a finished product.

In view of the foregoing, it is apparent that there has been provided an improved bit especially constructed and arranged to drive or set in an efficient and simple manner the particular non-removable screw fastener described.

While there has been described what is at present considered to be the preferred embodiment of the invention, it will be understood that various modifications may be made therein, and it is intended to cover in the appended claims all such modifications as fall within the true spirit and scope of the invention.

What is claimed is:
1. A bit for driving a threaded fastener comprising a longitudinally extending shank terminating in a flat front face disposed in a plane substantially normal to the axis of said shank and provided with a substantially circular boundary, two longitudinally extending and diametrically opposed flutes provided in said shank and extending forwardly into intersecting relation with said front face, each of said flutes including leading and trailing surfaces respectively forming at the intersection with said front face leading and trailing shoulders, said front face having X and Y axes of symmetry disposed at right angles to each other and intersecting each other at the longitu- dinal axis of said shank, one of said leading shoulders lying along a line positioned on one side of said Y axis and disposed above and substantially parallel to said X axis, the other of said leading shoulders lying along a line positioned on the other side of said Y axis and disposed below and substantially parallel to said X axis, one of said trailing shoulders lying along a line substantially coincident with said Y axis and disposed above said X axis, the other of said trailing shoulders lying along the line substantially coincident with said Y axis and disposed below said X axis, whereby said front face includes two sector-shaped and diametrically opposed wings and a narrow connecting bridge.

2. The bit set forth in claim 1, wherein the front end of said shank is provided with two circumferentially spaced-apart arcuate-shaped chamfered areas extending forwardly and radially inwardly into the respective circular boundaries of said wings at said front face.

References Cited by the Examiner

UNITED STATES PATENTS 1,956,963   5/1934   Salman.

FOREIGN PATENTS 201,705   3/1939   Switzerland.

WILLIAM FELDMAN, *Primary Examiner.*

R. V. PARKER, Jr., *Assistant Examiner.*